May 26, 1931.   J. C. BRAND   1,806,783

LEVER

Filed Oct. 29, 1929

Fig. 1-A

J. C. Brand, Inventor

By Emil F. Lange

Attorney

Patented May 26, 1931

1,806,783

UNITED STATES PATENT OFFICE

JAMES C. BRAND, OF LINCOLN, NEBRASKA, ASSIGNOR TO CHASE PLOW COMPANY, OF LINCOLN, NEBRASKA, A CORPORATION OF NEBRASKA

LEVER

Application filed October 29, 1929. Serial No. 403,200.

My invention relates to levers, its primary object being the provision of a greatly simplified lever mechanism.

Another object which I have in view is the provision of a lever capable of rocking a rock shaft and having simplified latching mechanism.

Another of my objects is the provision of a latching mechanism which involves a pivotal movement of the lever independently of the lever action.

Another of my objects is the provision of adjusting means in the handle whereby the handgrip of the lever may be adjusted into the most convenient position.

Another object which I have in view is the provision of adjusting features between the lever mount and the rack.

Having in view these objects and others which will be pointed out in the following description, I will now refer to the drawings, in which Figure 1 is a view in perspective of the lever and of the rack, portions of their supports being shown.

Figure 1:
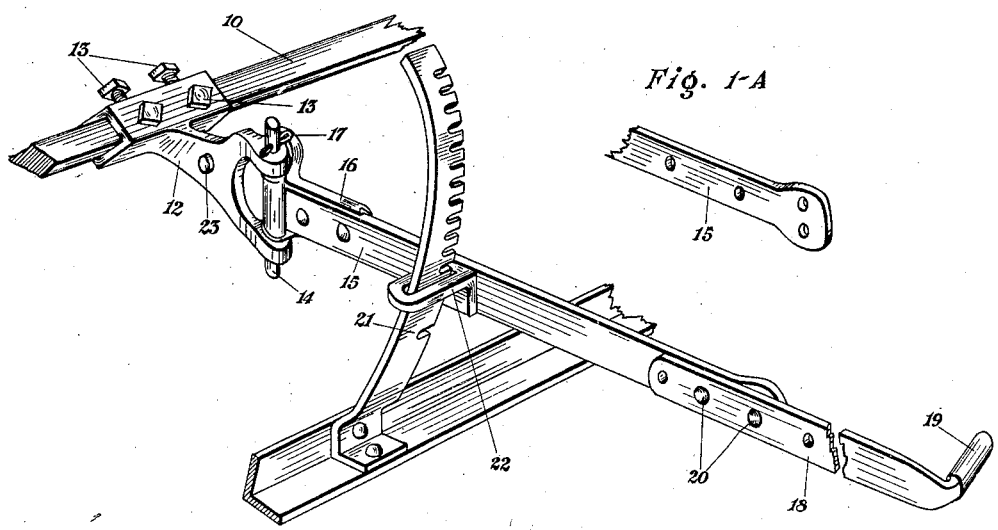
Figure 1A is a view of a portion of the lever as shown from the opposite side and showing particularly the apertures whereby the handle adjustment is made.

The rock bar is shown at 10. This may be a rock shaft or it may be any other member of the machine or implement which is to be rocked for the purpose of adjusting the position of another part of the machine or implement. In the present instance the lever is to be used on agricultural implements but it is obvious that the lever is of wider application. The angle iron 11 indicates any fixed beam or brace or other member of the machine or implement. The lever is designed for the purpose of rocking the rock bar 10 and for latching it in adjusted position in relation to the beam 11.

The casting 12 is releasably secured to the rock bar 10 by means of set screws 13 or any other suitable fastening devices. It is slidable along the rock bar 10 and it may be secured to the rock bar in its most effective position which will obviously depend not only on the use to which the rock bar is put but also on the position of the rack. The casting 12 has a fork at its forward end, the two fork members being provided with aligning apertures for receiving a pivot pin 14. The lever proper is shown at 15. This is rigidly secured to a casting 16 which is pivotally held by the pin 14 between the two fork members of the fork of the casting 12. The pin 14 is held in position by means of a pair of cotter pins 17 for preventing displacement. It will be obvious that the raising and lowering of the lever will rock the rock bar 10 but that the lever 15 may be moved laterally and freely without affecting the rock bar 10 or any other part of the machine or implement.

The lever 15 has a front extension 18 with a handgrip 19. The extension 18 is provided with four apertures in alignment while the lever 15 is provided with four apertures in the positions shown in Figure 1A. Two bolts 20 are employed for holding the extension and the lever together and it is obvious that the length of the entire lever may be altered or that the angular relation between the two parts of the lever may be altered. The two rear apertures in the lever 15 as shown in Figure 1A are in alignment with the lever. If the bolts 20 are then passed through these two apertures the two parts 15 and 18 will be in alignment and their length may be varied by properly selecting the apertures of the extension 18 for receiving the bolts 20. It is frequently desirable, however, that the handgrip 19 be adjustably raised or lowered without affecting the relation of the lever to the latch. This is particularly desirable in agricultural machinery where the lever should be within convenient reach of the driver and where the lever should consequently be capable of considerable adjustment. For the purpose for making this adjustment, it is only necessary to select one of the two rear apertures in the lever 15 and one of the three apertures in the rear part of the extension 18 and to connect them by means of a bolt 20. There will then be a pivotal relation between the two parts of the lever about this bolt and it is only necessary then to shift the extension 18 about its axis until one of its apertures is in alignment with one of the forward apertures of the lever 15 and to then pass a bolt through the aligning apertures. The arrangement here shown permits a large number of adjustments between the lever 15 and its extension 18.

Figure 2:
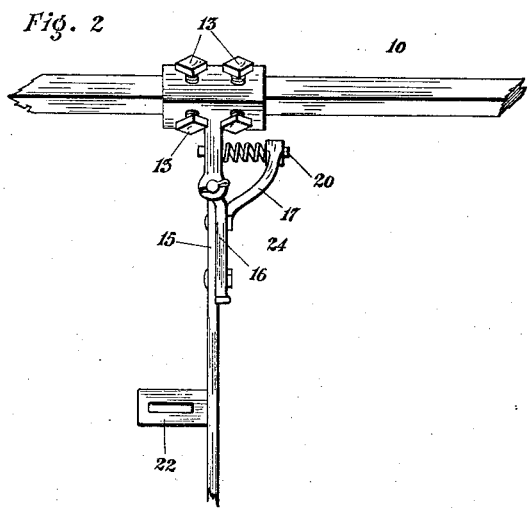
Figure 2 is a plan view of the lever.

A latch must be provided for the lever 15 especially when the lever is used for raising a tool such as a plow or the like. The arcuate rack 21 is secured to the beam 11 or to any other suitable fixed part of the machine or implement. The rack 21 is substantially in the form of an arc of a circle whose center lies in the axis of the rock bar 10. The rack 21 differs from most other racks in that it is notched in its lateral edge rather than in its peripheral edge. The lever 15 is provided with a latching member 22 having an elongated aperture for embracing the rack 21. The aperture must be somewhat greater in length than the width of the rack 21 so as to permit lateral play about the pin 14 for the purpose of latching and unlatching the lever. When the operator has his hand on the handgrip 19, movement in one lateral direction will release the latch and a movement in the opposite direction will engage the latch 22 in one of the notches of the rack 21. For automatically latching the lever I provide an arrangement shown in Figure 2. The casting 16 has an outwardly curved portion 17 with a transverse aperture in its end portion. This transverse aperture is adapted to receive a pin 23 passing through an aligned aperture in the casting 12. The purpose of the pin 23 is to support the compression spring 24 which normally urges the latching member 22 against the notched edge of the arcuate rack 21.

It will be apparent that the structure above described is susceptible of numerous variations and modifications all falling within the scope of my invention. I have shown and described the overlapping portions of the lever members 15 and 18 as being provided with four apertures each. It is obvious, however, that the number of apertures may be increased or decreased so as to provide adjustment in length and adjustment in angularity of the lever. Likewise, other structures may be substituted for the specific rack 21, for the specific spring 24 and for other members of the lever assembly which are all shown in considerable detail in my drawings.

The lever has numerous advantages over prior levers in all places in which it is adapted to be used. This is particularly true of agricultural implements where the condition of the work necessitates great simplicity in the lever action. In my lever the handgrip 19 has a wide range of adjustment so that it can be placed in the position where it will be most convenient for the operator of the implement, regardless of his size and regardless of the length of his arms. The hinge at 14 makes it extremely simple to unlatch the lever from the rack 21 and the lever may then be swung without difficulty to the desired position where it becomes automatically latched as soon as the lever is released. The usual form of lever in agricultural implements necessitates a handgrip for releasing the latch before the lever can be moved. The handgrip is often difficult because of the load which is carried by the rock bar. In my lever the handgrip is replaced by an arm movement which greatly facilitates the action of releasing the latch. The entire lever action is accomplished without any hand or finger movement whatever.

Having thus described my invention in such full, clear, and exact terms that its construction and operation will be readily understood by others skilled in the art to which it pertains, what I claim as new and desire to secure by Letters Patent of the United States is:

1. A lever for rocking a rock bar of an implement, an eccentric pivotal connection between said lever and the rock bar, the axis of said pivotal connection being perpendicular to the rocking axis of the rock bar, an arcuate rack secured at one of the extremities thereof to a fixed part of the implement and having laterally projecting teeth, and a slotted bracket projecting laterally from said lever and embracing said rack and having means thereon for latching engagement between the teeth of said rack.

2. A lever for rocking a rock bar of an implement, an eccentric pivotal connection between said lever and the rock bar, the axis of said pivotal connection being perpendicular to the rocking axis of the rock bar, an arcuate rack secured at one of the extremities thereof to a fixed part of the implement and having laterally projecting teeth, a slotted bracket projecting laterally from said lever and embracing said rack and having means thereon for latching engagement between the teeth of said rack, and means for normally urging said lever into latching engagement with said rack.

In testimony whereof I affix my signature.

JAMES C. BRAND.